United States Patent [19]

Nold

[11] Patent Number: 4,827,165

[45] Date of Patent: May 2, 1989

[54] INTEGRATED DIODE PACKAGE

[75] Inventor: Robert D. Nold, Rockford, Ill.

[73] Assignee: Sundstrand Corporation, Rockford, Ill.

[21] Appl. No.: 121,128

[22] Filed: Nov. 16, 1987

[51] Int. Cl.⁴ ............................................. H02K 11/00
[52] U.S. Cl. ................... 310/68 D; 310/42; 310/71; 310/54; 310/261; 29/598
[58] Field of Search ............ 310/68 R, 68 D, 42, 310/89, 90, 114, 165, 71, 54, 59, 261; 29/598; 357/76

[56] References Cited

U.S. PATENT DOCUMENTS

| | | | |
|---|---|---|---|
| 2,897,383 | 7/1959 | Barrows | 310/261 |
| 3,412,271 | 11/1968 | Hall | 310/71 |
| 3,447,118 | 5/1969 | Ferree . | |
| 3,471,157 | 10/1969 | Swearingen . | |
| 3,619,731 | 11/1971 | Baker et al. . | |
| 3,753,052 | 8/1973 | Rosser . | |
| 4,338,652 | 7/1982 | Romanczuk et al. . | |
| 4,482,827 | 11/1984 | Baldwin | 310/68 D |
| 4,494,171 | 1/1985 | Bland et al. . | |
| 4,499,485 | 2/1985 | Schierz et al. . | |
| 4,523,121 | 6/1985 | Takahashi et al. . | |
| 4,538,171 | 8/1985 | Stevens et al. . | |
| 4,570,094 | 2/1986 | Trommer . | |
| 4,581,695 | 4/1986 | Hoppe . | |
| 4,603,344 | 7/1986 | Trommer . | |
| 4,628,219 | 12/1986 | Troscinski . | |

FOREIGN PATENT DOCUMENTS 884588 10/1971 Canada .
763354 12/1956 United Kingdom .

Primary Examiner—R. Skudy
Attorney, Agent, or Firm—Dalton, Phillips Mason & Rowe Wood

[57] ABSTRACT

According to certain designs of a rotor for a synchronous generator having a rotating rectifier assembly carried by the rotor, the rotating rectifier assembly is journaled below a bearing. Exciter leads coupling an exciter to the rotating rectifier assembly must pass under the bearing, making installation and removal of the rotating rectifier assembly difficult.

In order to overcome the foregoing problem, a rectifier assembly for a generating system is disclosed. The rectifier assembly facilitates installation and removal of the rectifier assembly from the rotor cavity and comprises a tubular housing having a peripheral surface and an outwardly opening groove disposed in the surface and dimensioned to substantially completely and slidably receive an exciter lead when the housing is moved into or out of the cavity. The groove extends axially the length of the rectifier assembly and provides passage for the exciter lead during relative movement between the exciter lead and the rectifier assembly during installation and removal of the rectifier assembly.

15 Claims, 2 Drawing Sheets

INTEGRATED DIODE PACKAGE

FIELD OF THE INVENTION

This invention relates to a rectifier assembly adapted to be disposed in a rotor of a brushless generator, and more particularly to a rectifier assembly designed for easy removal from the rotor.

BACKGROUND OF THE INVENTION

In many generators, such as high speed generators utilized in aircraft, it is highly desirable to eliminate brushes since they frequently require maintenance and/or replacement, and are perhaps the single weakest point in the system in terms of breakdowns. Moreover, by its very nature, the electrical path between a brush and a commutator is subject to arcing which may introduce transients into the electrical energy being produced, which in turn, may interfere with proper operation of some types of electrical loads on the generator.

A typical brushless generator has three distinct generating systems including a main generator, an exciter, and a permanent magnet generator. The permanent magnet generator includes permanent magnets for establishing a magnetic field which is electrically employed to induce current in a set of windings, which in turn is employed after rectification to generate a magnetic field in the exciter. The magnetic field in the exciter is in turn employed to induce an even higher level of current, typically three-phase alternating current, which is then employed after rectification to generate the magnetic field for the main generator by flowing the DC current through the main field winding of the main generator.

In order to avoid the use of brushes, it is necessary that the magnetic field in the main generator be in the rotor so that the output of the system can be taken from the stator of the main generator. In order to generate a suitable magnetic field in the rotor, it is necessary to utilize direct current, as opposed to alternating current, for the same. Since the output of the exciter is an alternating current, this current must be rectified by a rectifier assembly to direct current. And, again, in order to avoid resort to brushes, it is accordingly necessary that the rectifier assembly interconnecting the exciter and the main generator field winding be carried by the rotor of the generator.

Such a rectifier assembly should also be capable of withstanding high centrifugal loading. Further, it should be easily removable for servicing in the event of component failure.

One such rectifier assembly is disclosed in commonly owned U.S. Pat. No. 4,628,219, issued Dec. 9, 1986 to Troscinski, the details of which are herein incorporated by reference. The Troscinski structure is intended for installation in a generator system wherein the generator shaft is supported by bearings. Exciter leads couple the exciter to the rectifier assembly. Further, the shaft has an opening in it between the rectifier assembly and the bearing through which the exciter leads pass from the rectifier assembly to the exciter. Accordingly, the exciter leads do not pass under the bearing. To remove the rectifier assembly from the rotor, one simply detaches the exciter leads from the rectifier assembly and pulls the exciter leads from the exciter through the opening and away from the path of removal of the rectifier assembly.

However, according to another rotor design, a Troscinski rectifier assembly will extend under the bearing. The exciter leads must pass under the bearing to couple to the exciter. Because of the resulting interference with the bearing, the exciter leads cannot be pulled away from the path of removal of the rectifier assembly. The exciter leads remain stationary and interfere with the installation and removal of the rectifier assembly. To install or remove the rectifier assembly, the bearing and rotor balance ring must first be removed.

The present invention is directed to overcoming one or more of the above problems.

SUMMARY OF THE INVENTION

It is the object of this invention to provide an improved rotating rectifier assembly which facilitates removal from a rotor cavity of a generating system comprising an exciter, a main generator having a field winding, a rectifier assembly coupled therebetween and wherein the exciter, main generator field winding and rectifier assembly are carried by a common rotor for rotation therewith.

The rectifier assembly is removably mounted in an axially elongated cavity of the rotor by sliding the rectifier assembly into the rotor cavity. The rectifier assembly is coupled to the exciter by exciter leads extending from the exciter to terminals located on an end of the rectifier assembly directed axially outwardly from the rotor cavity. The exciter leads are disposed under a bearing supporting the rectifier assembly and between the rectifier assembly and the rotor.

According to the invention, the rectifier assembly includes a tubular housing having an exterior surface and an axial groove along the exterior surface and extending the length of the housing. The axial groove provides a passage for the exciter lead disposed between the rectifier assembly and the cavity surface. Thus the rectifier assembly can be removed from the rotor by sliding past the exciter leads.

The groove further provides a passage for coolant flow over the periphery of the rectifier assembly.

In an embodiment for use with a three phase exciter having three exciter leads, the rectifier assembly includes three such grooves disposed 120 degrees apart.

Other features and advantages of the invention will be apparent from the following description taken in connection with the associated drawings.

DESCRIPTION OF THE PREFERRED EMBODIMENT

Figure 1:
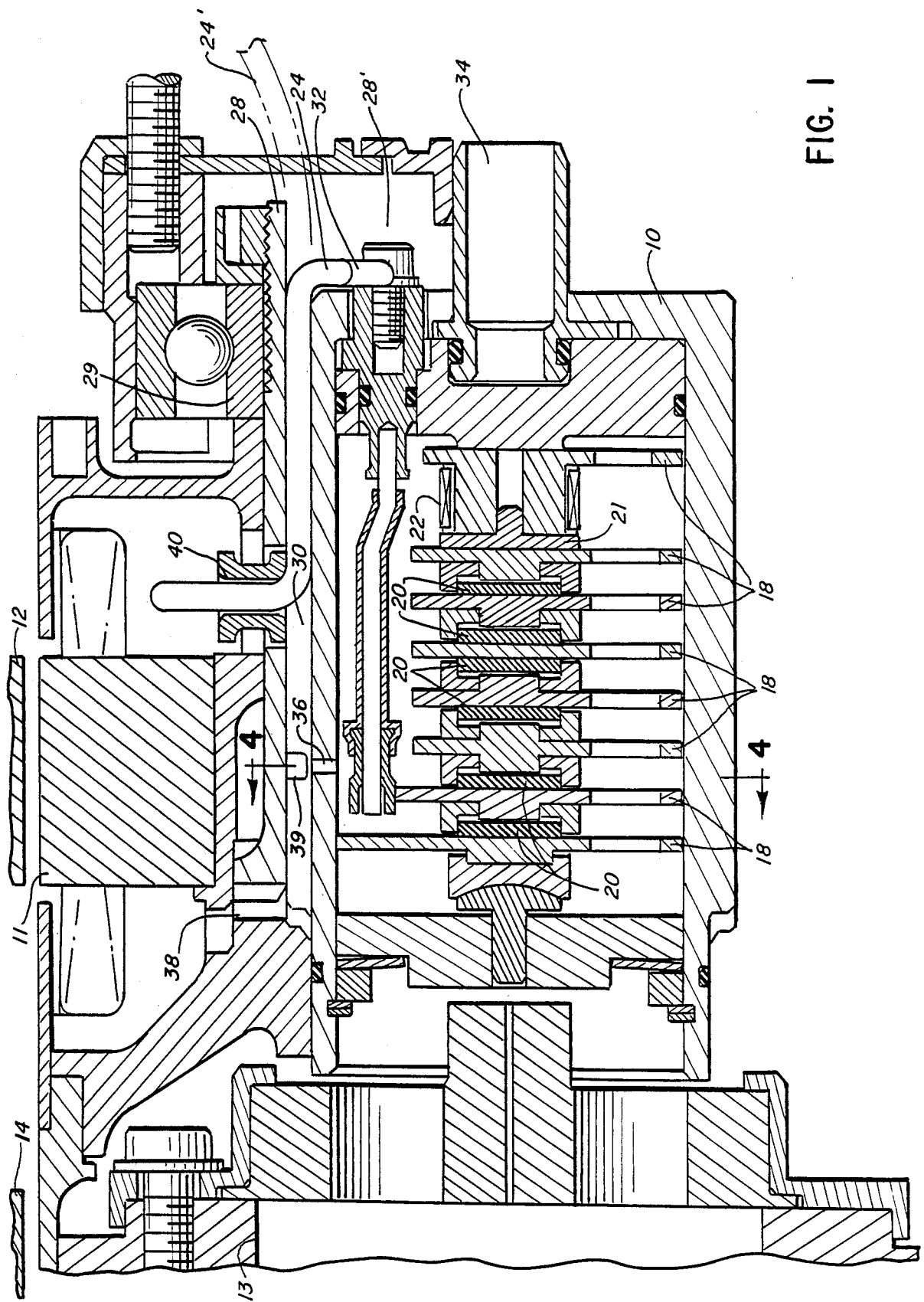
FIG. 1 is a sectional view of a rectifier assembly carried by a rotor in accordance with the present invention.

A rotating rectifier assembly according to the present invention is illustrated in FIG. 1 and is seen to include a generally cylindrical tubular housing 10. The rectifier assembly is coupled between an exciter having an exciter armature 11 and exciter field 12, and a main generator, having a main generator field 13 and a main generator armature 14.

The rectifier assembly includes eight, generally circular, relatively thin plates 18 which are formed of a material that is a good thermal and electrical conductor. The plates 18 are aligned with each other to form a stack, and sandwich six diode wafers 20, that is, diodes without their customary packaging, including terminals. One of the plates 18 and an insulator 21 sandwich a donut-like resistor 22. The several plates 18 and sandwiched wafers 20 are interconnected as a full wave rectifier diode bridge generally as disclosed in the previously identified Troscinski patent, and references may be had thereto for further details of the construction. For present purposes, it is sufficient to note that the diode bridge receives three phase AC current from the exciter armature 11 via exciter leads 24 and rectifies the received AC current to DC current to excite the main generator field 13 of the main generator.

According to one prior art generator (not shown), the rectifier assembly is carried by a rotor journal bearing, and the rotor journal bearing is located axially outward from the rectifier assembly. Thus, the exciter leads do not pass under the bearing.

In order to remove the rectifier assembly from this prior art rotor, the exciter leads are disconnected from the rectifier assembly and pulled radially outwardly from the exciter through an opening in the rotor. The rectifier assembly is then clear to be removed by sliding the rectifier assembly out of the rotor.

According to another generator however, the rectifier assembly itself extends below the bearing. In such arrangements, a notch in the peripheral surface of the rectifier assembly housing is required which extends from the exciter lead end of the rectifier assembly to the opening in the rotor. This notch allows the exciter leads to pass under the bearing. However, the exciter leads cannot be pulled outwardly through the opening in the rotor without first accessing the exciter leads by removing the bearing and related rotor balance ring.

The rectifier assembly according to the present invention will solve this problem.

Referring again to FIG. 1, the rectifier assembly is carried in a rotor cavity 28' of a rotor 28 journaled by a bearing 29. A longitudinal groove 30 is provided which extends along the outer periphery of the housing 10 for the entire length thereof and which opens axially outwardly from each of the ends. The groove 30 also opens radially outwardly from the housing 10. In the preferred embodiment wherein the exciter produces a three phase output, three grooves 30 are provided, one for each of the three exciter leads 24, and the grooves 30 are spaced 120° apart.

In order to remove the rectifier assembly from the rotor 28, the exciter leads 24 are disconnected from the rectifier assembly and are located radially outwardly therefrom, as illustrated in phantom as 24'. The rectifier assembly is then removed from the rotor 28 by sliding it outwardly past the outwardly located exciter leads 24'.

Figure 2:
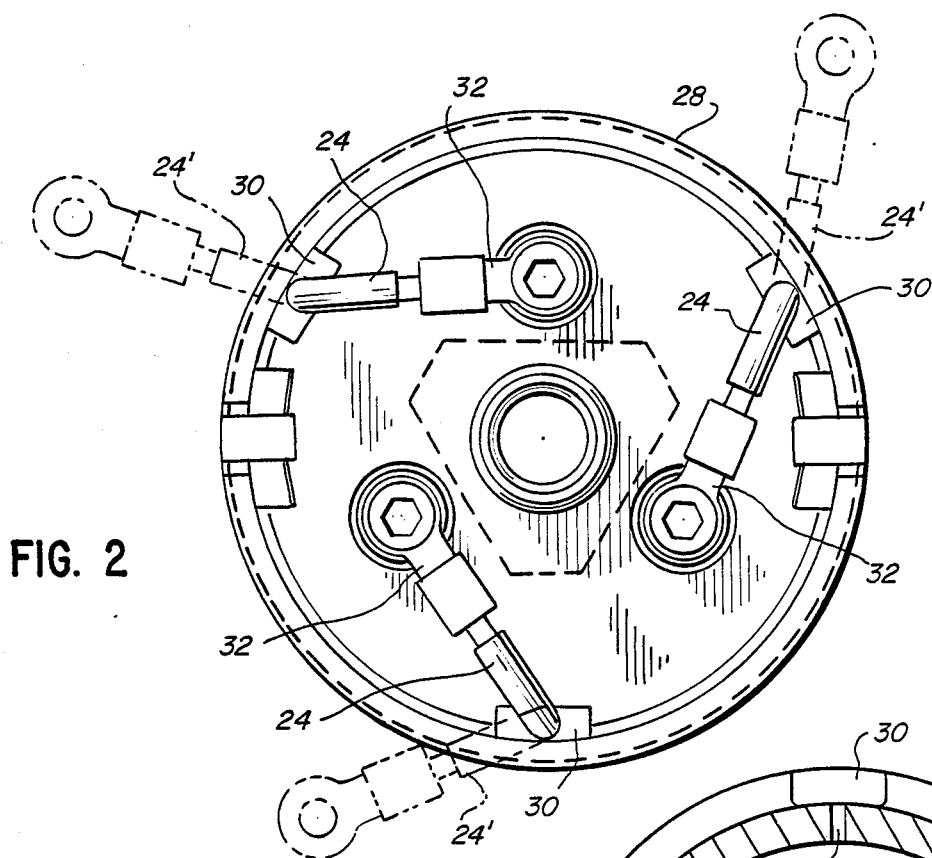
FIG. 2 is an end view of a rectifier assembly in accordance with the present invention.

The rectifier assembly is illustrated in FIG. 2 in an end view taken from the exciter lead end of the rectifier assembly.

The exciter leads 24 illustrated in FIGS. 1 and 2 usually will be sufficiently long so that spade terminals 32 provided on ends of the exciter leads 24 will not interfere with removal of the rectifier assembly.

Figure 3:
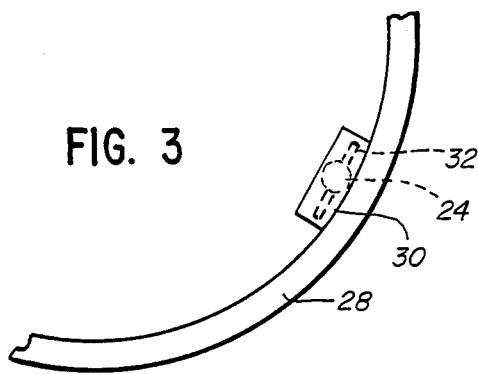
FIG. 3 is a partial end view of the rectifier assembly illustrated in FIG. 2.

In certain applications, the exciter leads 24 may not be sufficiently long to be pulled outwardly out of the way of the rectifier assembly. Accordingly, in these applications the grooves 30 are formed with sufficient width and depth to substantially completely receive and allow passage of the spade terminals 32, as illustrated in FIG. 3.

Figure 4:
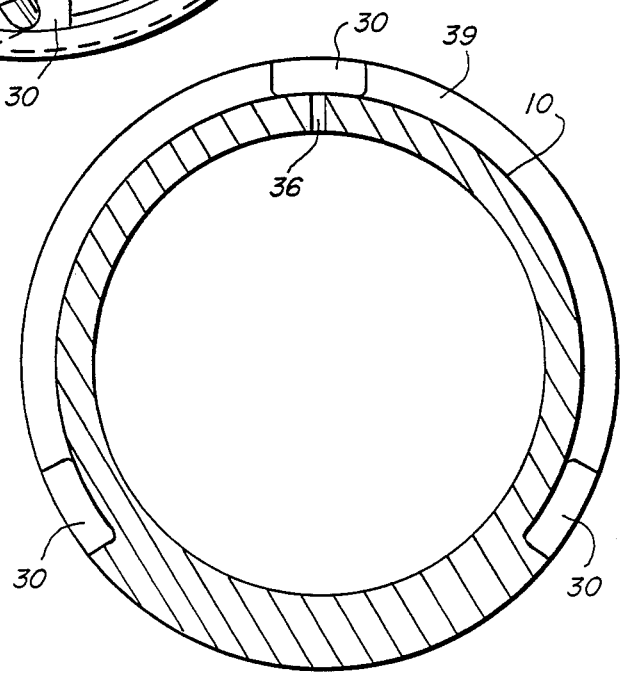
FIG. 4 is a sectional view of the rectifier assembly taken along line 4—4 of FIG. 1.

The grooves 30 further provide a passage for the flow of coolant fluid, as for example oil, which is conventionally flowed through the rotor 28 by well known means. Referring to FIG. 1, the fluid enters through a fitting 34, typically associated with a transfer tube (not shown), passes through the rectifier assembly to a radial oil port 36 opening into one of the grooves 30 and outward through a port drain 38. A circumferential channel 39, as illustrated in greater detail in FIG. 4, provides a passage for the fluid into the other two of the grooves 30. The fluid also flows outward from each of the grooves 30 through a loose fitting exciter lead grommet 40. Thus, this fluid flow provides additional cooling over the periphery of the rectifier assembly, and the exciter armature 11 which temperature can be of the order of 300° F.

To facilitate ease of manufacture, each the grooves 30 has a uniform cross-section along its entire length.

Thus the present invention provides a rectifier assembly which is easily installed and removed from a rotor cavity of a brushless synchronous generator and which provides additional cooling of electrical components housed within.

I claim:

1. A rectifier assembly for a generating system, the generating system including:
   a cavity in a rotor and a peripheral side having a radial opening therein;
   an exciter armature having exciter leads electrically coupled to and extending from the exciter armature and at least one of said leads extending through the opening and into the cavity;
   a bearing supporting the rotor for rotation;
   a housing having a peripheral surface;
   a rectifier assembly located in said housing and electrically coupled to at least one terminal located at an end of said housing; and
   the housing being installed within the cavity wherein the opening is located between the housing and the bearingm, and the one exciter lead extends to said one terminal for electrical connection thereto;
   the improvement in said rectifier assembly wherein the housing is installed to extend beyond the opening and within a circumference defined by the bearing; and
   an outwardly opening groove on said surface axially extending the length of the housing, wherein at least one of said exciter leads is routed through the radial opening and extends within the cavity and longitudinally through the cavity beyond the bearing and housing to said one terminal to be substantially completely and slidably received by said groove during installation and removal of the housing.

2. The brushless generator rotor of claim 1 wherein said housing is cylindrical.

3. The brushless generator rotor of claim 1 including means for directing a flow of coolant along said groove.

4. The brushless generator rotor of claim 1 wherein said housing includes a plurality of said axial groove, one for each of said exciter leads.

5. The brushless generator rotor of claim 4 wherein there are three said axial groove spaced 120° apart.

6. The brushless generator rotor of claim 1 wherein said groove has a uniform cross-section along its length.

7. The brushless generator rotor of claim 1 wherein at least one of said exciter leads is coupled to the rectifier assembly by a spade terminal and wherein said groove is dimensioned to substantially completely and slidably receive said spade terminal.

8. A generating system comprising:
a three phase exciter;
a main generator having a main generator field;
a three phase rectifier assembly carried by a rotor for rotation therewith;
a bearing supporting said rotor; and
three exciter leads coupling said exciter to said rectifier assembly and passing between said bearing and said rectifier assembly,
said rectifier assembly comprising a generally tubular housing having a plurality of radially outwardly opening grooves, one for each of said exciter leads, and extending axially along the surface thereof, said grooves dimensioned to substantially completely receive said exciter leads to facilitate installing the rectifier assembly in and out of the rotor.

9. The rectifier assembly of claim 8 wherein said grooves are circumferentially spaced apart by 120 degrees.

10. The rectifier assembly of claim 8 including means for directing coolant flow along each of said grooves.

11. For use in a generating system including a main generator having a field winding and an exciter armature having exciter leads for providing current to said field winding, said exciter armature and main generator field winding carried by a rotor supported by a bearing,
a rectifier assembly for receipt in said rotor and said bearing to rectify the current generated by the exciter armature into DC current for the main field winding and having:
a generally tubular housing; and
at least one longitudinal groove extending the length of the housing and opening outwardly therefrom, said groove dimensioned to substantially completely receive at least one exciter lead as said exciter lead(s) passes between said housing and said bearing when said rectifier assembly is mounted in said rotor to facilitate installation and removal of the rectifier assembly from the rotor without interference with the exciter lead.

12. The rectifier assembly of claim 11 wherein said tubular housing is generally cylindrical.

13. The rectifier assembly of claim 11 including means for directing coolant flow through one groove.

14. The rectifier assembly of claim 11 including a plurality of said grooves circumferentially spaced equally apart.

15. The rectifier assembly of claim 11 wherein:
at least one of said exciter leads includes a terminal spade for coupling to said rectifier; and
said one groove is dimensioned to substantially completely receive said terminal spade as said rectifier assembly is removed from the rotor.

* * * * *